(12) United States Patent
Herley

(10) Patent No.: US 8,856,140 B2
(45) Date of Patent: Oct. 7, 2014

(54) QUERYING DIALOG PROMPTS USING HASH VALUES

(75) Inventor: Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 568 days.

(21) Appl. No.: 12/480,877

(22) Filed: Jun. 9, 2009

(65) Prior Publication Data

US 2010/0312548 A1 Dec. 9, 2010

(51) Int. Cl.
*G06F 17/30* (2006.01)
*G06F 9/44* (2006.01)

(52) U.S. Cl.
CPC ........ *G06F 17/30967* (2013.01); *G06F 9/4446* (2013.01)
USPC ............................ 707/747; 707/736; 707/758

(58) Field of Classification Search
USPC .................................. 707/736, 758
See application file for complete search history.

(56) References Cited

U.S. PATENT DOCUMENTS

| | | | |
|---|---|---|---|
| 6,446,119 B1 | 9/2002 | Olah et al. | |
| 7,076,495 B2 | 7/2006 | Dutta et al. | |
| 7,197,535 B2 | 3/2007 | Salesky et al. | |
| 7,299,281 B1 | 11/2007 | Wang et al. | |
| 7,594,176 B1 * | 9/2009 | English | 715/708 |
| 7,672,543 B2 * | 3/2010 | Hull et al. | 382/305 |
| 2002/0033844 A1 * | 3/2002 | Levy et al. | 345/744 |
| 2005/0188057 A1 * | 8/2005 | Joo | 709/219 |
| 2005/0283609 A1 * | 12/2005 | Langford | 713/176 |
| 2006/0184410 A1 | 8/2006 | Ramamurthy et al. | |
| 2006/0203006 A1 | 9/2006 | Georgeson | |
| 2006/0227992 A1 * | 10/2006 | Rathus et al. | 382/100 |
| 2007/0011334 A1 | 1/2007 | Higgins et al. | |
| 2007/0015118 A1 | 1/2007 | Nickell et al. | |
| 2007/0046982 A1 * | 3/2007 | Hull et al. | 358/1.15 |
| 2007/0050341 A1 * | 3/2007 | Hull et al. | 707/3 |
| 2007/0101291 A1 * | 5/2007 | Forstall et al. | 715/805 |
| 2007/0198593 A1 | 8/2007 | Prahlad et al. | |
| 2007/0198825 A1 * | 8/2007 | Schwarz | 713/151 |
| 2007/0300179 A1 | 12/2007 | Friedlander | |
| 2008/0215722 A1 * | 9/2008 | Hogaboom et al. | 709/224 |
| 2009/0036190 A1 * | 2/2009 | Brosnan et al. | 463/16 |
| 2011/0164826 A1 * | 7/2011 | Noguchi et al. | 382/253 |

OTHER PUBLICATIONS

"Capture My Screen 1.02", retrieved on Jun. 9, 2008 at <<http://www.capture-my-screen.com/>>, Namtuk, 2004-2007, pp. 1-2.

Griffiths, et al., "An improved method of studying user-system interaction by combining transaction log analysis and protocol analysis", retrieved on Jun. 13, 2008 at <<http://informationr.net/ir/7-4/paper139.html>>, Information Research, vol. 7, No. 4, Online, Jul. 2002, pp. 1-20.

(Continued)

*Primary Examiner* — Tony Mahmoudi
*Assistant Examiner* — Michael Le
(74) *Attorney, Agent, or Firm* — Stephen A. Wight; Judy Yee; Micky Minhas

(57) ABSTRACT

Implementations can be used to initiate a query for information regarding a dialog prompt or other pop-up type of prompt or image. Further, implementations may use hash values in proxy for images to enable aggregating of images for creating a knowledge base regarding certain images determined to be of interest.

19 Claims, 11 Drawing Sheets

(56) References Cited

OTHER PUBLICATIONS

Hammond, et al., "An Agent-Based System for Capturing and Indexing Software Design Meetings", retrieved on Jun. 4, 2008 at <<http://www.cs.washington.edu/homes/kgajos/papers/WAID02.pdf>>, Proceedings of International Workshop on Agents in Design (WAID), Cambridge, MA, Aug. 2002, pp. 1-18.

Yan, "WinFast Capture", retrieved on Jun. 9, 2008 at <<http://www.ycysoft.com/en/WinFastCaptureShow.htm>>, Chunyi Yan, 2003-2006, pp. 1-2.

\* cited by examiner

| Hash Value | Pointer to Stored Image | Count |
|---|---|---|
| HV1 | | 1 |
| HV2 | | 1 |
| HV3 | Pointer to Image 3 | 2 |
| HV4 | | 1 |
| ... | ... | ... |
| HVN | | 1 |

USER HASH TABLE

Fig. 7

| Hash Value | Pointer to Stored Image | Count | Webpage Identifier |
|---|---|---|---|
| HV1 | Pointer to Image 3 | 4 | |
| HV2 | Pointer to Image 3 | 2 | |
| HV3 | Pointer to Image 3 | 98 | Webpage 3 |
| HV4 | Pointer to Image 3 | 1 | |
| ... | ... | ... | ... |
| HVN | Pointer to Image N | 1 | |

Aggregated Hash Table

Fig. 9

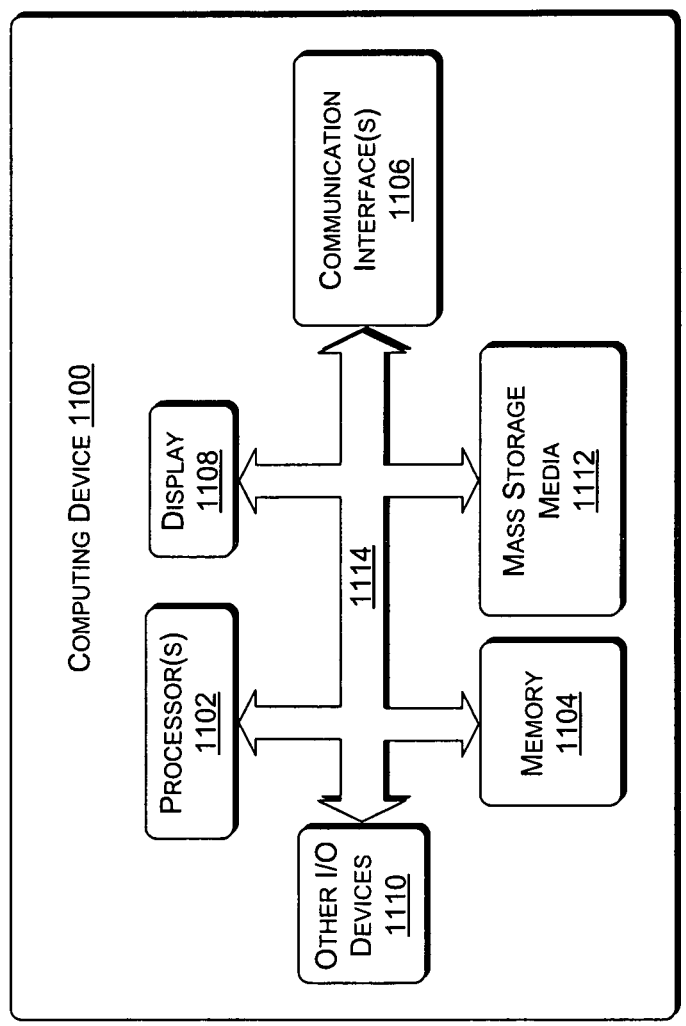

QUERYING DIALOG PROMPTS USING HASH VALUES

BACKGROUND

Dialog prompts, dialog boxes and similar pop-up prompts, pop-up windows, pop-up boxes, and the like, (referred to hereinafter as "dialog prompts") often appear on computer displays during use of various different applications and operating system features on a computer. For example, an application may determine that an upgrade is available for the application, and open a dialog prompt, such as when the application is opened, to prompt the computer user to upgrade the application. Other times, a dialog prompt may be overlaid on top of one or more open windows on a computer display such as when the operating system, an antivirus program, or other program determines, for example, that the firewall is not properly configured, the antivirus signatures are out of date, a website is trying to access a non-trusted domain, etc. Additional examples of such dialog prompts include error messages produced by applications or the operating system, questions regarding an action requested by the user, and various other types of messages or questions that request a user response or notify the user that the application or operating system needs to take some sort of action.

Sometimes these dialog prompts contain a substantial amount of text that is not understood by the user, and thus, the dialog prompts ask the user to make a decision for which the full impact is not understood by the user. For example, the user may not know which application or program is the actual source of the dialog prompt, and may not understand the reason for the dialog prompt or the entire consequences of any decision made. In other instances, the user may view the dialog prompt as an annoyance, and simply wish to get rid of the dialog prompt so as to not have the dialog prompt reappear subsequently.

Conventionally, users will tend to either make a decision without completely understanding the question posed by the dialog prompt, or simply close the dialog prompt, which can result in the dialog prompt reoccurring or result in some other action taking place that might be undesired by the user. Furthermore, in order to actually determine what the dialog prompt is about, it is typically necessary for the user to cut and paste or write down the message posed in the dialog prompt, and enter this message into a search window of a text-based Internet search engine. The user then uses the search engine to attempt to locate a website that discusses the dialog prompt and then try to determine possible responses or solutions, such as for avoiding subsequent instances of the dialog prompt. This process can be tedious and annoying for the user, and can result in user dissatisfaction with the application or operating system that is the cause or subject of the dialog prompt.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein enable computer users to query information about images by using hash values in proxy for images. Additionally, in some implementations, images can be aggregated for creating a knowledge base regarding certain images determined to be of interest.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 7 illustrates an exemplary user hash table according to some implementations.

FIG. 9 illustrates an exemplary aggregated hash table according to some implementations.

FIG. 11 illustrates an exemplary computing device and functionality according to some implementations.

DETAILED DESCRIPTION

Overview

Implementations herein use hash values in proxy for images to enable aggregating and indexing of images from multiple computing devices for creating a knowledge base regarding certain images determined to be of interest to computer users while also protecting user privacy. Further, implementations disclosed herein enable a computer user to locate information on a dialog prompt or other pop-up type of prompt or image. For example, when a dialog prompt pops up on a computer screen, users are able to right-click on the dialog prompt and choose a menu item that opens the user's web browser and directs the web browser to access a website for opening a webpage that discusses the particular dialog prompt. Thus, in some implementations, the process can be carried out automatically in response to the selection of a menu item, without the user having to enter text from a dialog prompt into a search window or otherwise carry out a manual search for information on the dialog prompt.

In some implementations, a service runs on the user's computing device, and upon each mouse click made by the user of the computing device, an image of a window or object that is the focus of the mouse click is captured by the service running on the computing device. For example, if the user clicks to close a dialog prompt, then the dialog prompt is the image that is captured for that mouse click. For each image that is captured, a hash value of the image is calculated using a hash function and stored in a hash table, but the image itself is not stored unless the hash value already exists in the hash table. In other words, only dialog prompts that have been seen at least twice on the computing device are stored as images on the computing device, which protects user privacy, as discussed further below. Over time, the service acquires a list of hash values and corresponding stored images that have been seen at least twice on the computing device.

Subsequently, according to some implementations, the hash values are aggregated across multiple user computing devices having the service running thereon. The images associated with the hash values that have been seen on multiple user computing devices are placed on a website, such as a wiki-type website or forum-type of website, to enable other users and experts to comment on the dialog prompts. With enough users participating, the website is able to provide information on each of the dialog prompts for guiding decisions of users faced with a particular dialog prompt. Accordingly, implementations herein are able to take advantage of collective wisdom available from a large number of users, rather than relying on the knowledge of any single individual.

Figure 1:
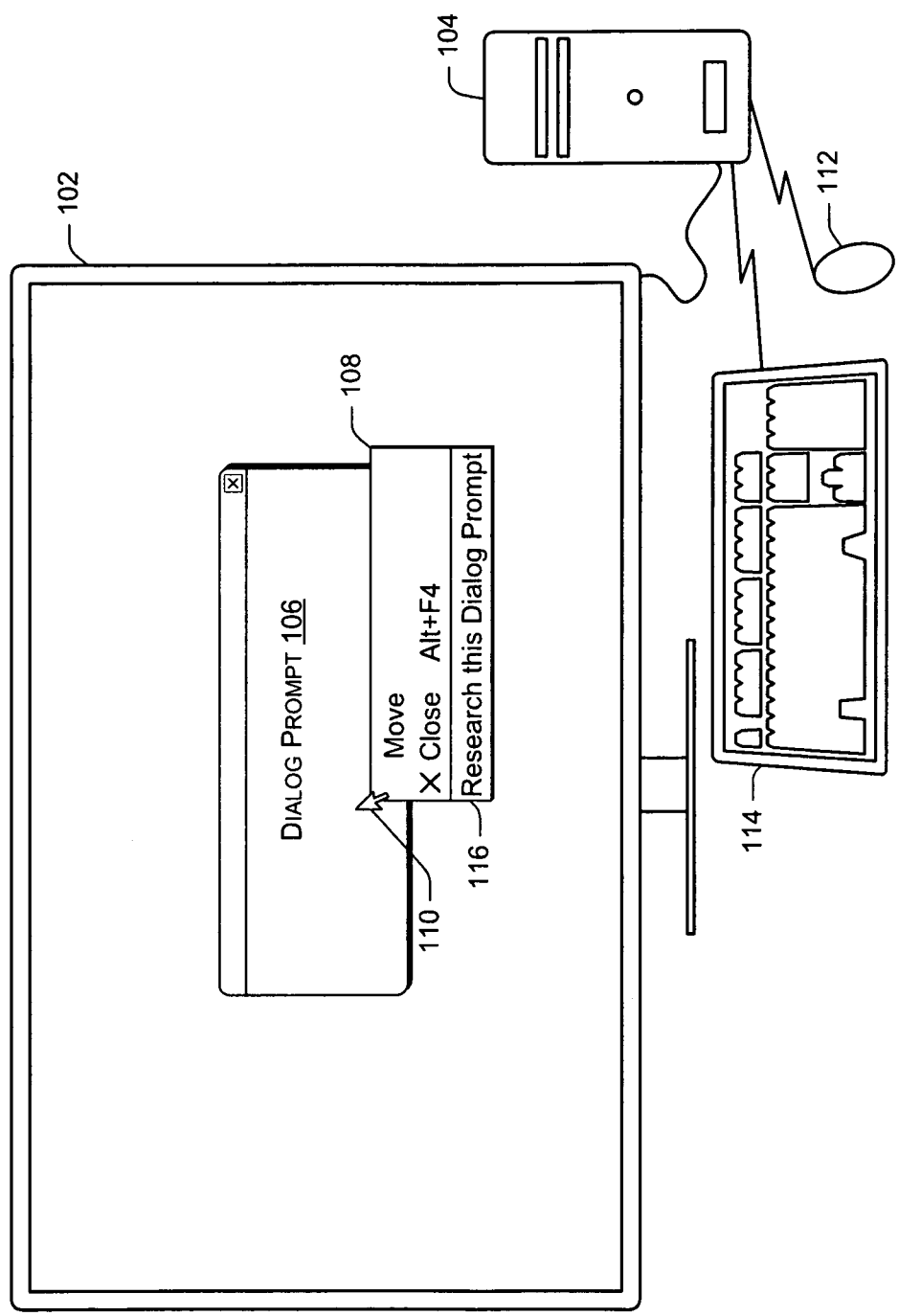
FIG. 1 illustrates an exemplary implementation for gathering information on a dialog prompt.

FIG. 1 illustrates an exemplary implementation which includes a display device 102 that displays images produced by a user computing device 104. In this example, display device 102 receives and displays an image of a dialog prompt 106 during use of the computing device 104. In response to the appearance of the dialog prompt 106, according to some implementations, the user is able to activate a menu 108 to enable the user to gather information on the dialog prompt 106. As one example, the user can right-click on the dialog prompt 106 with a cursor or pointer icon 110 of a mouse 112, or use another input/output (I/O) device, such as a keyboard 114 to initiate the menu 108. Thus, right clicking on the image of the dialog prompt 104 or other predefined user action causes menu 108 to appear as a drop down menu on the display 102. The menu 108 includes a menu item 116 that is displayed as a selectable item that is selectable using the input device 112 for researching the dialog prompt to determine how to respond to the dialog prompt, stop the dialog prompt from reoccurring, or the like.

Figure 2:
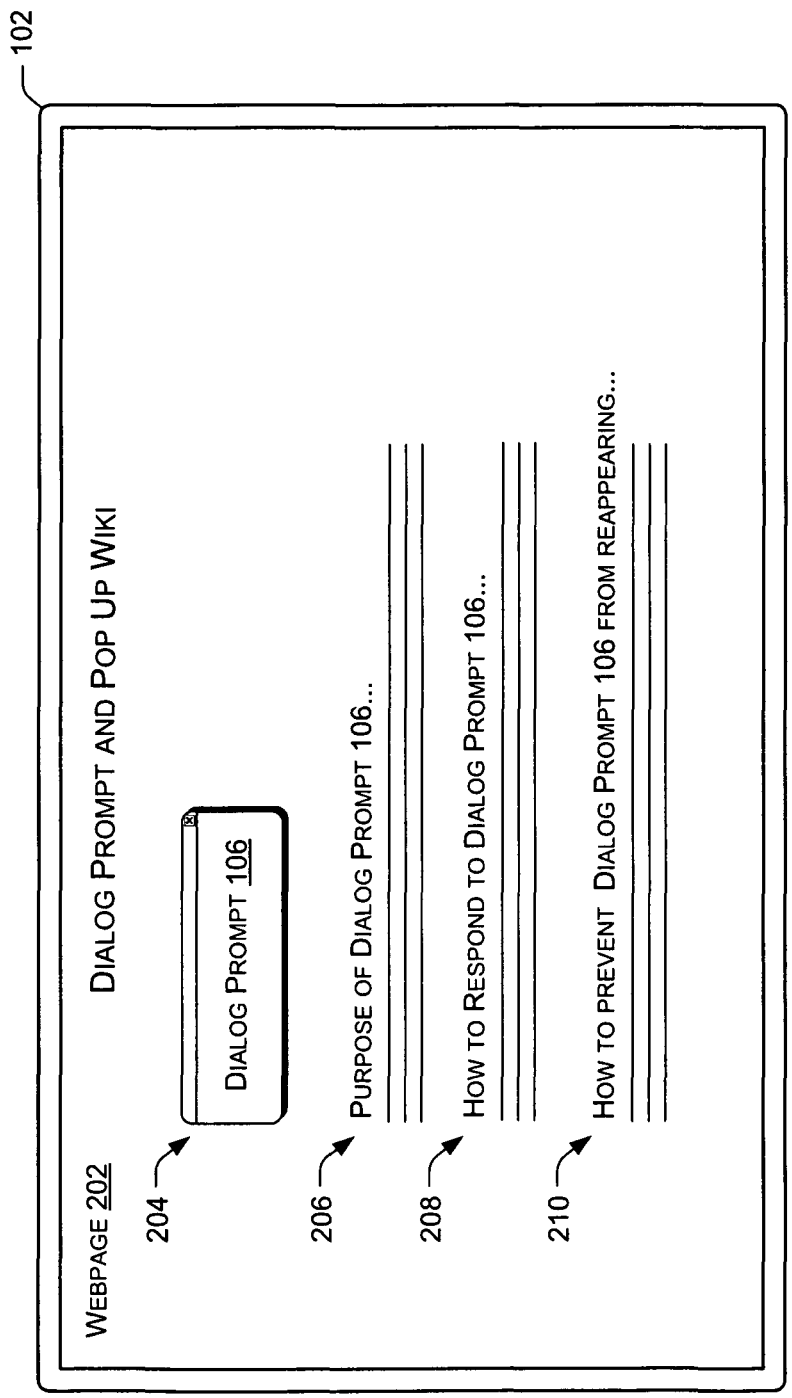
FIG. 2 illustrates an exemplary webpage according to some implementations.

As illustrated in FIG. 2, when the user selects menu item 116 to research the dialog prompt 106, this causes the user's web browser to access a website that contains information on the dialog prompt 106. The web browser transmits a hash value calculated for the image of the dialog prompt to the website, and the website is able to use the hash value to locate the appropriate webpage 202 corresponding to the image of the dialog prompt. For example, the webpage 202 may be part of a wiki-type website or forum-type website that enables individuals, such as other users, experts, or the like, to comment on or describe particular dialog prompts and optimum responses or solutions to the dialog prompts. In the illustrated example, the webpage 202 includes an image 204 of the dialog prompt 106 to enable the user to verify that the correct webpage as been accessed. Webpage 202 also may include a discussion 206 on the cause or purpose of the dialog prompt 106, a discussion 208 on recommended ways to respond to the dialog prompt 106, and/or a discussion 210 on how to get rid of dialog prompt 106 or prevent dialog prompt 106 from reappearing. When the user has determined a desired course of action, the user can close the web browser and respond to the dialog prompt 106. Of course, it should be understood that the foregoing example is merely one possible non-limiting implementation, and that a large number of other implementations and features are included within the scope of the disclosure herein, as discussed in the additional implementations set forth below.

Exemplary System Architecture

Figure 3:
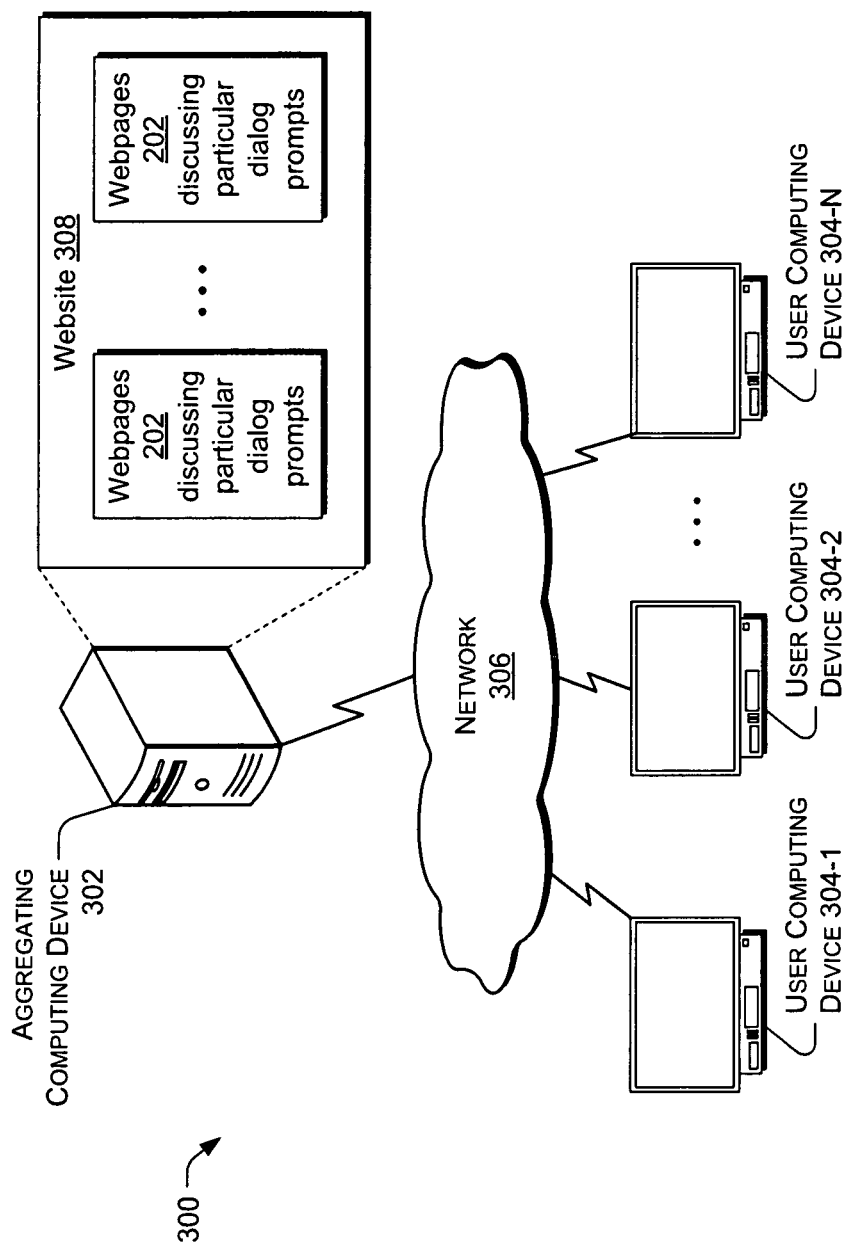
FIG. 3 illustrates an exemplary system architecture according to some implementations disclosed herein.

FIG. 3 illustrates one example of a system 300 for aggregating and creating information about images including dialog prompts and similar pop-up windows, operating system objects, and the like, and for providing information on the images to computer users. To this end, the system 300 includes a plurality of computing devices 302, 304 in communication, such as via a network 306. One or more of these computing devices is an aggregating computing device 302, while at least some of the other computing devices are user computing devices 304-1, 304-2, . . . , 304-N. In some implementations, aggregating computing device 302 exists as a part of a data center, server farm, or the like. For example, aggregating computing device 302 may be a server, a personal computer, or a mainframe computer. In some implementations, aggregating computing device 302 also hosts a website 308 for providing information on images, such as dialog prompts, to user computing devices 304. The information may be contained in webpages 202 accessible by the user computing devices 304 over network 306, such as via web browsers, or the like. In other implementations, however, aggregating computing device 302 is separate from a web-hosting computing device, such as a web server (not shown) that hosts the website 308.

The system 300 can include any number of the aggregating computing devices 302 and/or user computing devices 304. For example, in one implementation, network 306 is the Internet, and the system 300 includes numerous servers, personal computers (PCs), workstations, terminals, mobile computing devices and other computing devices spread throughout the world as aggregating computing devices 302 and user computing devices 304. Alternatively, in another possible implementation, the system 300 can include just a single aggregating computing device 302 in communication with a limited number of user computing devices 304 via a LAN (local area network) or a WAN (wide area network), such as within a single company, or the like. In some implementations, user computing devices 304 are personal computers, workstations, terminals, or the like. In some implementations, user computing devices 304 include mobile computing devices, such as PDAs (personal digital assistants), cell phones, smartphones, laptops, palmtops, or other portable computing devices having data processing capability.

The computing devices 304 can be coupled to each other and/or to the aggregating computing device 302 in various combinations through wired and/or wireless networks, including a LAN, WAN or any other networking technology known in the art. In addition, aggregating computing device 302 may be a number of computing devices spread over network 306 in communication with each other, and each carrying out parallel or separate functions. Furthermore, while a particular exemplary architecture is illustrated in FIG. 3, it should be understood that other suitable architectures may also be used, and that implementations herein are not limited to any particular architecture.

Exemplary Logical and Hardware Configurations

Figure 4:
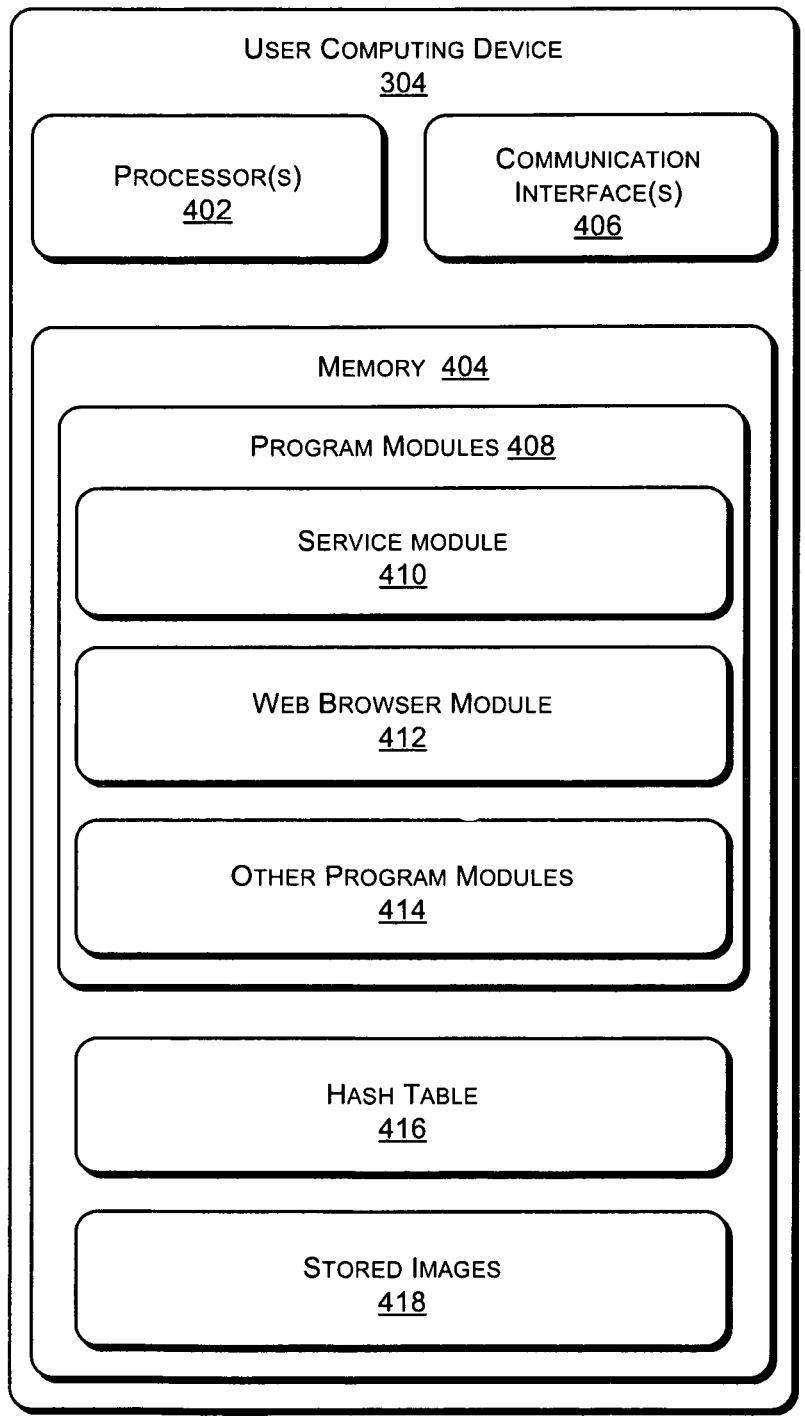
FIG. 4 illustrates an exemplary logical and hardware arrangement for a user computing device according to some implementations.

FIG. 4 illustrates an exemplary logical and hardware configuration of a user computing device 304 on which the service described above is implemented. In the illustrated example, user computing device 304 includes one or more processors 402, a memory 404, and one or more communication interfaces 406. The processor(s) 402 can be a single processing unit or a number of processing units, all of which could include multiple computing units. The processor(s) 402 may be implemented as one or more microprocessors, microcomputers, microcontrollers, digital signal processors, central processing units, state machines, logic circuitries, and/or any devices that manipulate signals based on operational instructions. Among other capabilities, the processor(s) 402 can be configured to fetch and execute computer-readable instructions stored in the memory 404 or other computer-readable storage media.

The memory 404 can include any computer-readable storage media known in the art including, for example, volatile memory (e.g. RAM) and/or non-volatile memory (e.g., flash, etc.), mass storage devices, such as hard disk drives, solid state drives, removable media, including external and removable drives, or the like. The memory 404 stores processor-executable program instructions or code that can be executed by the processor(s) 402 for carrying out the services, methods and functions described herein.

The communication interface(s) 406 facilitate communication between the user computing device 304 and aggregating computing device 302. The communication interface(s) 406 can facilitate communications within a wide variety of networks and protocol types, including wired networks (e.g., LAN, cable, etc.) and wireless networks (e.g., WLAN, cellular, satellite, etc.). In one implementation, the user computing device 304 can provide information on images of dialog prompts seen on the user computing device 304 through the communication interface(s) 406 and the user computing device 304 can retrieve relevant information on one or more dialog prompts via the communication interface(s) 406.

Memory 404 includes a plurality of program modules 408 stored therein and executable by processor(s) 402 according to implementations herein. Program modules 408 include a service module 410, described in additional detail below for implementing the dialog prompt information services, and a web browser module 412. Memory 404 may also include other program modules 414, such as an operating system, applications, communication software, drivers, and the like. In addition, memory 404 also stores a hash table 416 and one or more stored images 418 for implementing the dialog prompt information service provided by service module 410. It should be noted that, in some implementations, service module 410 is part of the operating system, while in other implementations, service module 410 is provided as a separate service from the operating system. Further, while an exemplary implementation has been described, it will be appreciated that other implementations are not limited to the particular logical and hardware configuration illustrated in FIG. 4.

Figure 5:
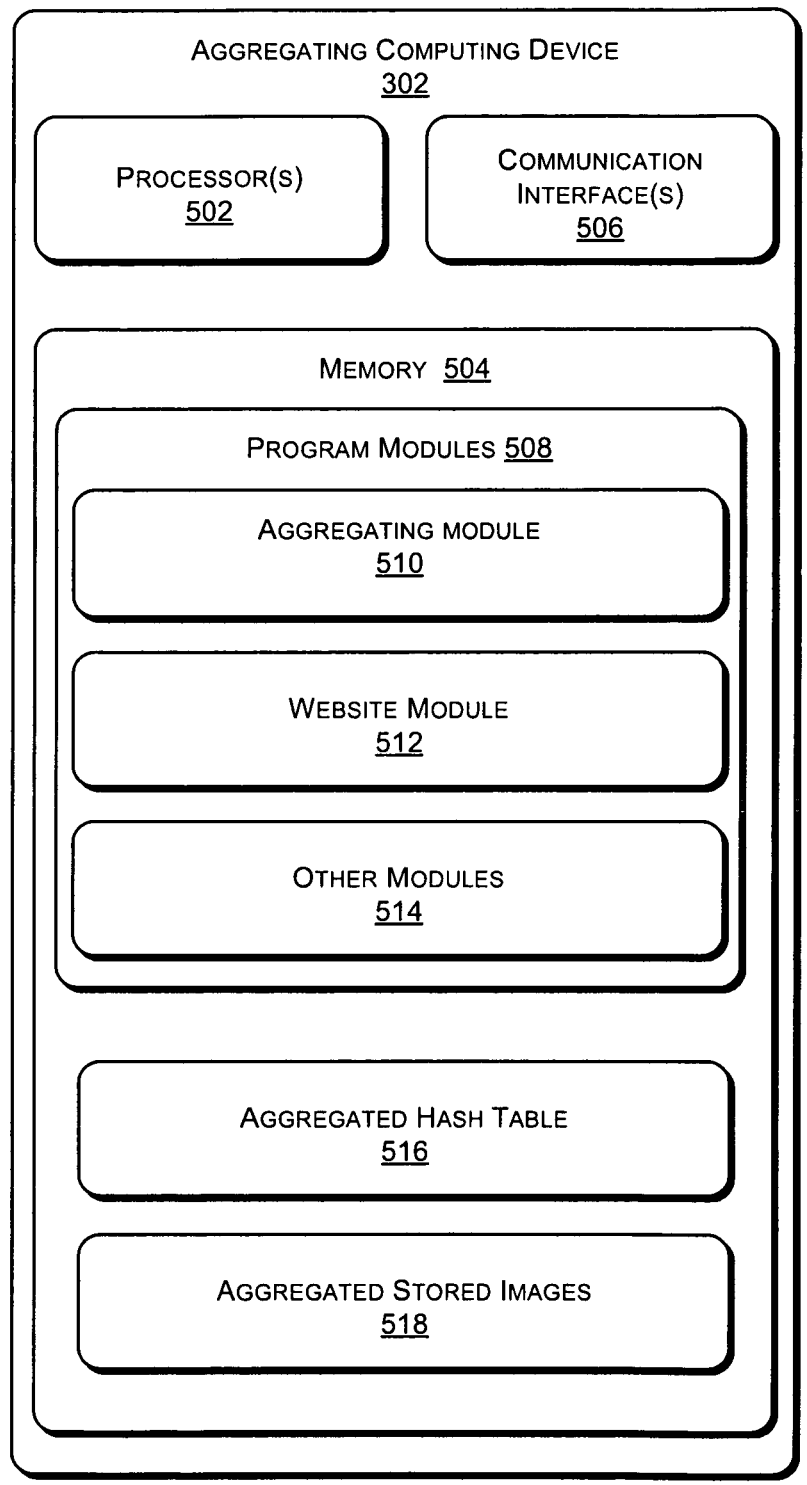
FIG. 5 illustrates an exemplary logical and hardware arrangement for an aggregating computing device according to some implementations.

FIG. 5 illustrates an exemplary aggregating computing device 302 for aggregating and providing information on images, such as dialog prompts. In the illustrated example, aggregating computing device 302 includes one or more processors 502, a memory 504, and one or more communication interfaces 506. The processor(s) 502 can be a single processing unit or a number of processing units, all of which could include multiple computing units. The processor(s) 502 may be implemented as one or more microprocessors, microcomputers, microcontrollers, digital signal processors, central processing units, state machines, logic circuitries, and/or any devices that manipulate signals based on operational instructions. Among other capabilities, the processor(s) 502 can be configured to fetch and execute computer-readable instructions stored in the memory 504 or other computer-readable storage media.

The memory 504 can include any computer-readable storage medium known in the art including, for example, volatile memory (e.g. RAM) and/or non-volatile memory (e.g., flash, etc.), mass storage devices, such as hard disk drives, solid state drives, removable media, including external and removable drives, or the like. The memory 504 stores processor-executable program instructions or code that can be executed by the processor(s) 502 for carrying out the services, methods and functions described herein.

The communication interface(s) 506 facilitate communication between the aggregating computing device 302 and user computing devices 304. Furthermore, the communication interface(s) 506 may include one or more ports for connecting to a number of user computing devices 304, such as for providing web site services. The communication interface(s) 506 can facilitate communications within a wide variety of networks and protocol types, including wired networks (e.g., LAN, cable, etc.) and wireless networks (e.g. WLAN, cellular, satellite, etc.). In one implementation, the aggregating computing device 302 can receive and aggregate information on hash values and corresponding images of dialog prompts from a plurality of user computing devices 304 via the communication interface(s) 506 and the aggregating computing device 302 provide access to relevant information on particular dialog prompts back to the user computing devices 304 via the communication interface(s) 506.

Memory 504 includes a plurality of program modules 508 stored therein and executable by processor(s) 502 for carrying out implementations herein. Program modules 508 include an aggregating module 510 for aggregating hash values and images received from client computing devices 304. Memory 504 also includes a website module 514 and other modules 516, such as an operating system, communication software, drivers, and the like. Memory 504 may further include an aggregated hash table 516 and corresponding aggregated stored images 518. In some implementations, aggregating computing device 302 receives a plurality of hash values and corresponding images from a plurality of user computing devices 304, and processors 502 aggregate these hash values and images to create the aggregated hash table 516 and aggregated stored images 518. Since each of the hash values and images have already been seen at least twice by each user computing device 304, and if the number of user computing devices 304 that have seen a particular image and corresponding hash value at least twice is at least a minimum threshold number, for example five or ten, then this eliminates the possibility that any personal information is represented by any of the images associated with the hash values sent from the user computing devices 304 to the aggregating computing device 302. The aggregating hash table 516 and corresponding aggregated stored images 518 are used by the website module to create webpages for display on the website. For example, each hash value represents an image of a dialog prompt for which a webpage is created. In the case of a wiki-type webpage, the webpages may have content added by numerous other users, experts, or the like may, to provide information about the dialog prompt on each webpage. Further, while the example illustrated shows that the website module 512 is contained within the aggregating computing device 302, it will be appreciated that in other implementations, the website module may be in a separate computing device such as a separate web server that provides a website. Other variations will also be apparent to those of skill in the art, and thus, implementations disclosed herein are not limited to the particular example illustrated.

Implementations on the User Computing Devices

Figure 6:
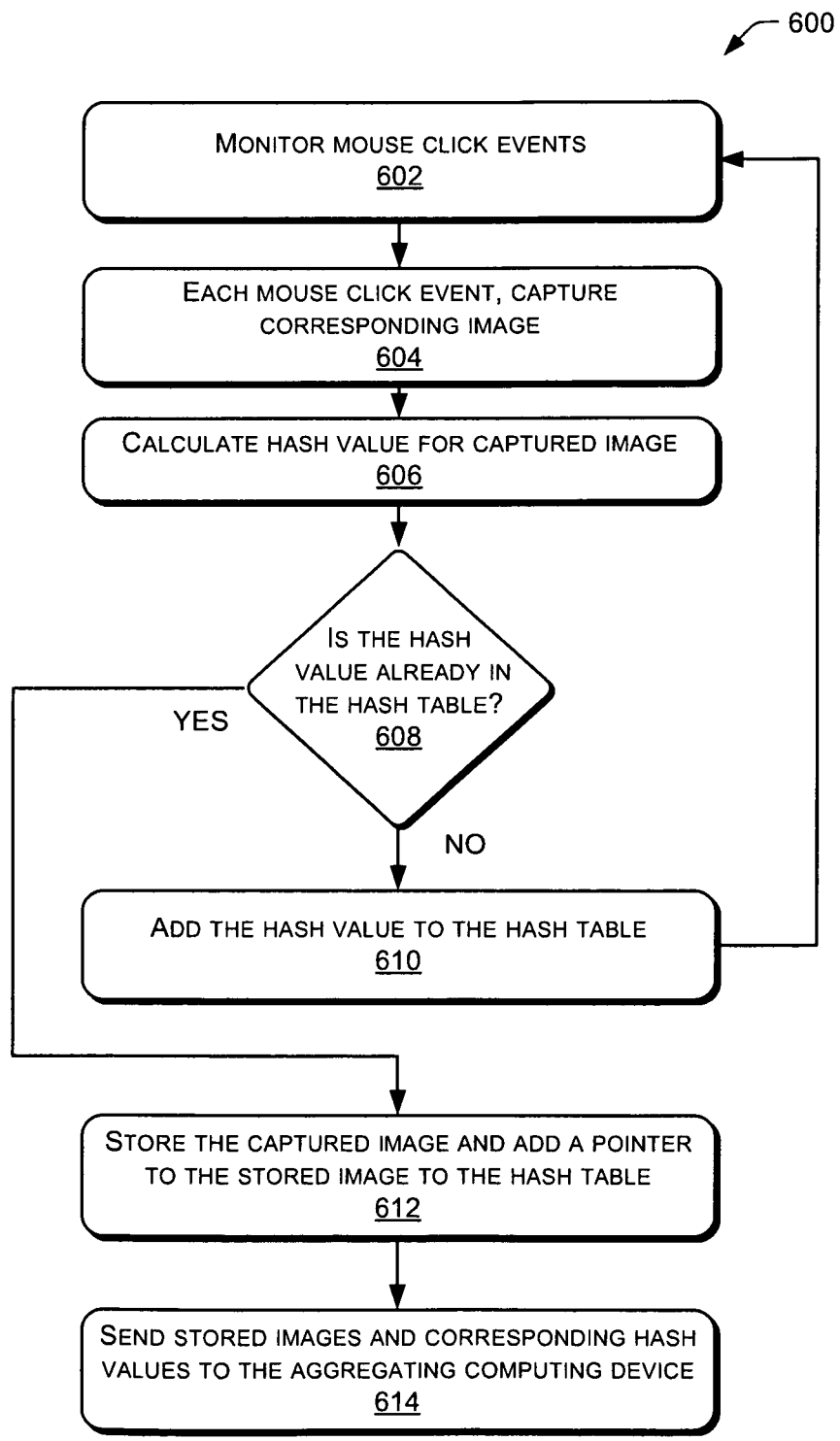
FIG. 6 illustrates a flowchart of an exemplary process executed by a user computing device according to some implementations.

FIG. 6 illustrates a flowchart of an exemplary process 600 executed by a user computing device 304 according to some implementations. The process may be executed by processors 402 executing instructions stored in memory 404 for implementing service module 410 to make the corresponding service available to a user of user computing device 304.

At block 602, the service becomes active and runs in the background for monitoring mouse click events that take place on the computing device. For example, the service may be a module of the operating system of the computing device, and is activated when the operating system of the computing device starts up. Alternatively, the service may become active upon activation by the user of the computing device, or upon some other triggering event.

At block 604, every time a mouse click event takes place on the user computing device, an image correspond to the window that is the focus of the mouse click is captured. For example, if the user clicks on a button to dismiss a dialog prompt, then the image of the dialog prompt is the image that is captured.

At block 606, a hash value for the captured image is calculated using a hash algorithm such as MD5, SHA-1, or other suitable hash algorithm. For example, the hash value is computed from the bitmap or other primitive graphic command of the captured image to produce a much shorter binary value that corresponds uniquely (within an acceptable probability) to the captured image. Furthermore, since a hash value calculation cannot be reversed, the captured image cannot be reconstructed based on the stored hash value, thereby protecting the privacy of the user by only storing hash values and not storing the actual image unless the same image is repeated two or more times on the user computing device. In addition, to further ensure protection of user privacy, additional safeguards can be taken, such as not capturing images of certain windows when certain applications are in use, such as e-mail applications, web-browsing applications or the like. For example, the service might be disabled when certain applications are open.

Furthermore, it should be noted that the image that is captured will typically be in the form of a bitmap, operating system object, or other primitive graphics command sent down the stack of the operating system, and not necessarily a screen capture bitmap taken from the image already rendered on the display. For example, hash algorithms are generally very sensitive to even a single bit difference in an image being hashed. Thus, a single bit difference can result in a completely different hash value even though the two images might otherwise appear to be very similar or identical. Accordingly, in some implementations, a bitmap or other primitive graphic command corresponding to the image is hooked or captured by maintaining the image in a buffer when the image is sent up the operating system stack to be rendered on the display. This technique results in images such as dialog prompts being able to be repeated identically because the bitmap or other image information generated by the program that generates the dialog prompt is always the same for a particular pop-up prompt, whereas windows containing images created by a user in many applications such as when viewing a photograph, email or text document are almost impossible to duplicate bit-for-bit a second time, thereby rendering the likelihood of having two matching hashes of such an image extremely improbable. As an example, in some implementations, the dialog prompts are operating system objects, which are sent down the stack by the program or operating system module generating the dialog prompt, and then sent back up by the operating system as an operating system object for rendering on the display. Thus, these dialog prompts are rendered uniformly each time from the same graphics primitive, which can be captured and buffered, whereas such is not the case with a typical window opened by a user. Accordingly, the chance of personal user information or images being sent outside the user computing device by the service is virtually non-existent.

At block 608, the calculated hash value generated for the captured image is compared with any hash values already existing in the hash table 416 stored in memory 404 to determine whether the captured image corresponding to the calculated hash value has already been displayed before on the user computing device, or is the first instance of the image.

At block 610, when the hash value is not already stored in the hash table stored in hash table 416, the hash value is added to the hash table and the process returns to block 602 to continue monitoring mouse click events.

At block 612, on the other hand, when the hash value is already stored in the hash table 416, this indicates that the captured image has already been displayed at least once on the user computing device, and thus is likely to be a dialog prompt or other operating system object. As a result, the captured image is stored and a pointer is added to the hash table for the hash value that points to the storage location of the captured image. Furthermore, if there is already a pointer in the hash table for the hash value, then it is not necessary to store the newly captured image or a new pointer, since an identical image has already been stored.

FIG. 7 illustrates an exemplary hash table 416 that includes a hash value column 702, a stored image pointer column 704 and a count column 706. As hash values are calculated for each image captured at each mouse click, the hash values are added to the hash value column 702 if the particular hash value is not already stored in the hash table 416, as illustrated by hash values 708-1, 708-2, 708-4, 708-N. However, when a hash value has already been stored in hash table 416 once, and then an identical hash value is calculated again from a newly captured image, this indicates that the image has been displayed at least twice, and the corresponding image is stored. Further, a pointer to the stored image is placed in the hash table for the corresponding hash value, and the count 706 for that hash value is incremented, as indicted for hash value 708-3.

Referring back to FIG. 6, at block 614, the stored image and corresponding hash value is sent to the aggregating computing device. For example, the stored image and hash value can be sent each time an image is stored, or a plurality of the stored images and corresponding hash values can be sent periodically to the aggregating computer, such as once a day, once a week, once a month etc. Further, if the user computing device is not always connected to the network, then the stored images and corresponding hash values can be set when the user computing device becomes connected to the network. As another example, the stored images and corresponding hash values might only be uploaded to the aggregating computing device when the user of a particular user computing device requests information on a particular dialog prompt for the first time. Thus, at that time the stored images and corresponding hash values on the particular user computing device can be uploaded to the aggregating computing device while the user is in contact with the website. Other variations will also be apparent to those of skill in the art in light of the disclosure herein.

Implementations on the Aggregating Computing Devices

Figure 8:
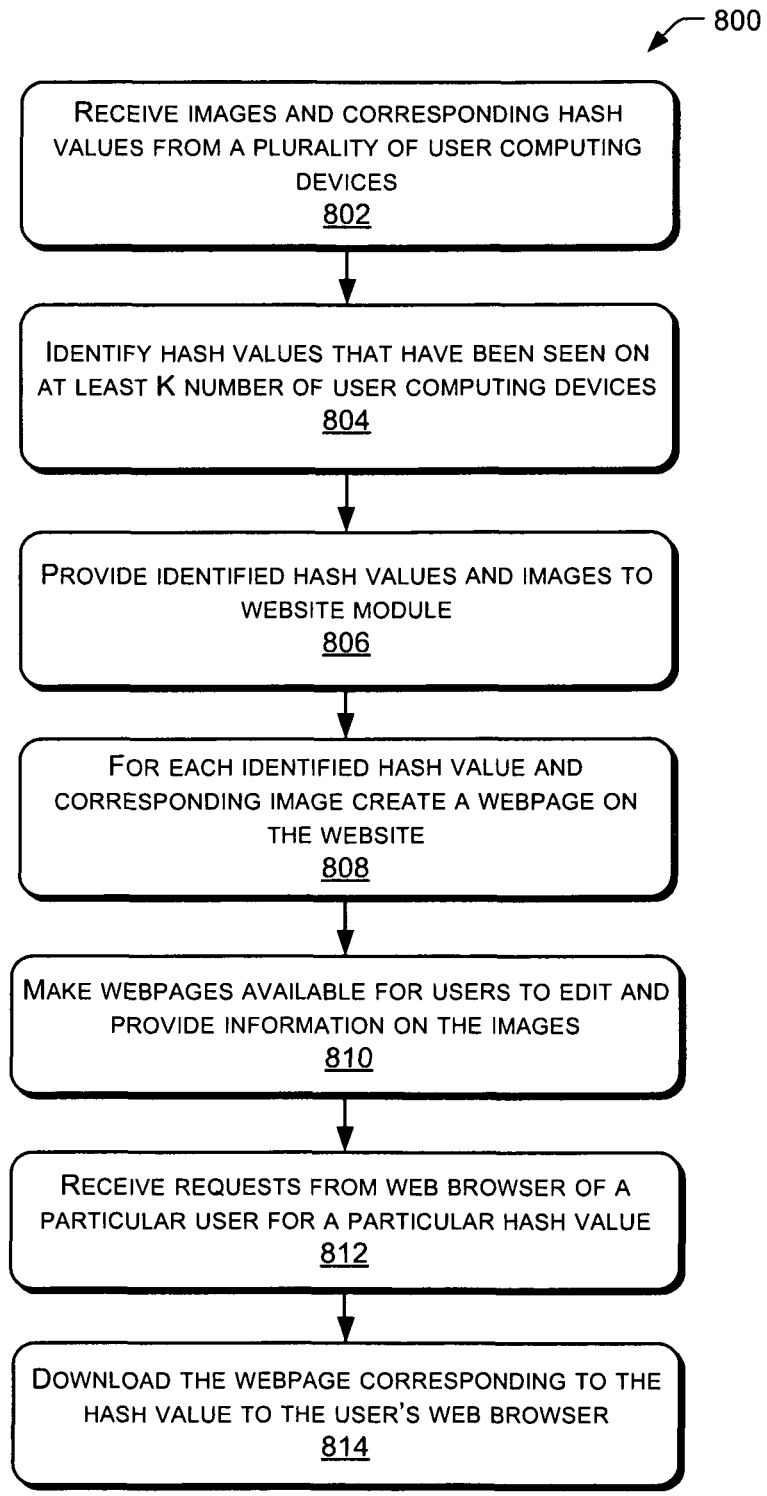
FIG. 8 illustrates a flowchart of an exemplary process executed by an aggregating computing device according to some implementations.

FIG. 8 illustrates a flowchart of an exemplary process 800 executed by an aggregating computing device 302 according to some implementations. The process may be executed by processors 502 executing instructions stored in memory 504 for implementing aggregating module 510 and website module 512 for aggregating and providing information on images, such as dialog prompts.

At block 802, aggregating computing device 302 receives images and corresponding hash values from a plurality of user computing devices 304. For example, as discussed above, the user computing devices having the service module 410 running thereon will periodically send to the aggregating computing device images and corresponding hash values that have been seen at least twice on the user computing devices. The hash values and pointers to corresponding images received by aggregating computing device 302 are stored in aggregated hash table 516, as illustrated in FIG. 9. Aggregated hash table 516 includes a hash value column 902, a pointer to stored image column 904, a count column 906, and, for implementations that also include website module 512 in aggregating computing device 302, a webpage identifier column 908. For example, as hash values are received from the user computing devices 304, each received hash value is compared with the hash values already existing in the hash table 516, and an if a match is found, the count for that hash value is incremented by one in count column 906. Otherwise, if no match is found, the received hash value is stored in a new location in hash table 516, along with a pointer to a storage location of the corresponding image. A count of matching hash values is kept in count column 906 for each hash value and compared with the minimum threshold number. When the minimum threshold number is exceeded, a webpage is created for the corresponding image. In the illustrated example, if the threshold number is, for instance, five, then a webpage, "webpage 3" has been created for the image corresponding to the hash value HV3 stored at entry 910-3. The other hash value entries 910-1, 910-2, 910-4, 910-N have not yet exceeded the minimum threshold of five, and therefore do not yet have corresponding webpages.

Referring back to FIG. 8, at block 804, the process uses the count column 906 to identify hash values that have been seen on at least a minimum threshold number of user computing devices, for example "K" number of user computing devices 304, where K is the minimum threshold. By setting a minimum threshold number of users the privacy of the users is ensured since it is unlikely that a plurality of different of user computing devices have the exact same image of personal information of any particular user displayed twice on multiple different user computing devices. As an example, the minimum threshold K may be set at 5, 10, 100, or any other number, depending on how large a number of images it is desired to provide information for on the website. For example, if the threshold K is set to 1000, then only when 1000 different users have seen the same image twice on their computing devices will a webpage be created for the particular image. On the other hand, when the threshold K is set to 5, a larger number of images will have webpages created for the on the website, since then it is only necessary for five different users to have seen the same image twice on their computing devices.

At block 806, the hash values and corresponding images identified in block 804 as having a count meeting the minimum threshold K are provided to the website module. As discussed previously, the website module may be implemented on the same computing device 302 as the aggregating module, or on a separate website server. For ease of explanation, in this example, the website module is implemented on the aggregating computing device 302.

At block 808, when a new hash value is identified as having a count exceeding the minimum threshold K, the website module creates a new webpage corresponding to the newly identified hash value, and may include the corresponding image for the newly received hash value in the webpage. A webpage identifier is added to the aggregated hash table 516, and this may be used by the website module for identifying the webpage when a corresponding hash value is received in a query from a user trying to access the webpage.

At block 810, the webpages for each of the identified hash values are made available on the website. As discussed previously, the webpages may be in the form of wiki-type pages or forum-type pages that enable users to provide information and comment on the particular dialog prompt or other image that is the subject of the page. Accordingly, other users, including experts, are able to comment on the particular dialog prompts and provide information that is useful to non-expert users as to how to respond to a particular dialog prompt. With a sufficient number of users participating, a collective wisdom is created that is much greater than that of any individual user, and thus, the website forms a database that is able to guide user decisions. Alternatively, a commercial-support-type website may be created in which the provider of the service also provides paid experts that describe each dialog prompt and responses or solutions. Alternatively, the software manufacturer may have the opportunity to detail in a portion of the wiki page software manufacturer's account of what the dialog prompt means, and how the dialog prompt should be treated. Other variations will also be apparent in view of the disclosure herein.

At block 812, the website receives a request from a web browser of a particular user computing device, as discussed above with respect to FIGS. 1 and 2. For example, as described above with reference to FIG. 1, a particular user computing device displays a particular dialog prompt 106. The user right clicks on the dialog prompt and selects menu item 116 to determine how to respond to the particular dialog prompt. This causes the web browser module 412 on the user computing device to access the website 308 and, further, causes the service running on the user computing device computer to calculate the hash value for the image of the particular dialog prompt. This calculated hash value is also transmitted to the website when the web browser accesses the website, thereby enabling the website to direct the user's web browser to the particular webpage that corresponds to the particular calculated hash value. For example, the hash value can be transmitted as part of a query string in the Uniform Resource Locator (URL) passed from the web browser to the website. The website module receives this hash value and refers to the aggregated hash table 516 to locate the corresponding webpage identifier. Furthermore, in some implementations, when a webpage for the particular calculated hash value does not already exist, the website will ask the user if they would like to have a webpage created.

At block 814, the website downloads the webpage corresponding to the particular hash value to the user computing device. For example, the website receives the particular hash value via the query string in the URL passed from the web browser to the website. The website can then compare the received hash value with the hash values for which webpages are maintained in the aggregated hash table, and direct the browser to the correct webpage by downloading the corresponding webpage to the browser. Thus, the hash values can be used as an index for locating the corresponding webpages on the website, and this index can be searched for locating a webpage relevant to a particular hash value received from a user computing device. Should a webpage not exist for the particular hash value, the website can return a message indicating that no information is available for the particular dialog prompt. Alternatively, or in addition, the website can ask the user if the user would like to have a webpage created for the particular dialog prompt. In such a case, the image corresponding to the hash value for the particular dialog prompt is uploaded by the browser to the website. Further, in such a case, a corresponding webpage might not be created until a certain number of users have requested that a webpage be created for the particular dialog prompt. For instance, a dialog prompt that has been seen by a number of users is much more likely to be in need of being addressed by the website than a dialog prompt that has only been seen by a single user.

Retrieving Information on Dialog Prompts

Figure 10:
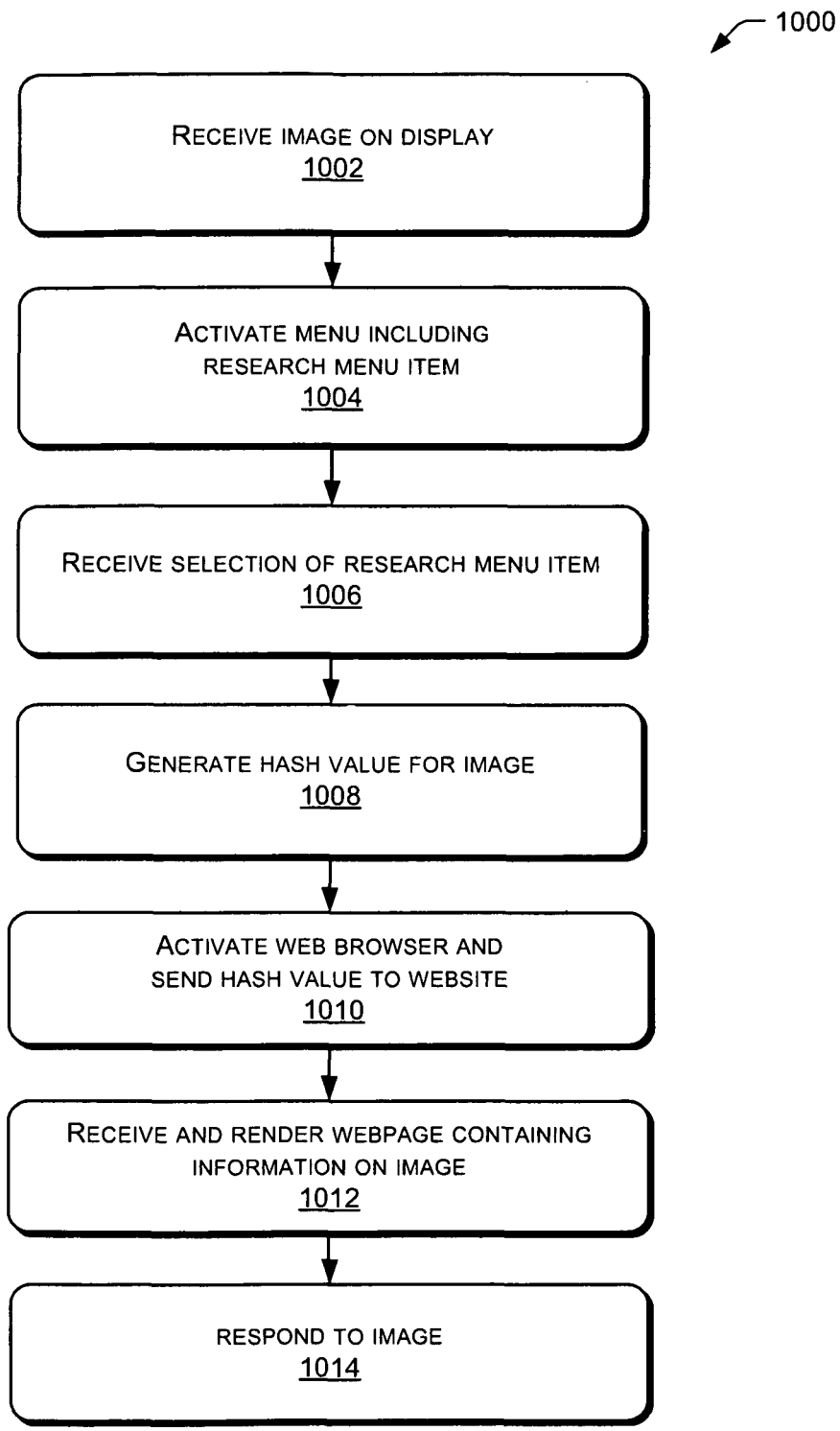
FIG. 10 illustrates a flowchart of an exemplary process executed by a user computing device according to some implementations.

FIG. 10 illustrates a flowchart of an exemplary process 1000 executed by a user computing device 304 according to some implementations. The process may be executed by processors 402 executing instructions stored in memory 404 for implementing service module 410 to make the corresponding service available on user computing device 304.

At block 1002, an image of dialog prompt is displayed on the display of user computing device 304, as also illustrated in FIG. 1.

At block 1004, a menu is activated that includes a menu item that can be selected for determining how to respond to the displayed dialog prompt. For example, as illustrated in FIG. 1, the menu item may be a "research dialog prompt" menu item 116 or the like that is selectable with a mouse or other I/O device.

At block 1006, a selection of the research menu item 116 is received by the user computing device, such as by the selection of the menu item 116 with a mouse to initiate a query to gather information on the particular dialog prompt.

At block 1008, a hash value is generated for the image of the dialog prompt. For example, when the mouse 112 is used to right-click on the menu item, this can be detected as a mouse click event, to cause a hash value to be generated for the image of the dialog prompt. As discussed above, this image is generated from the graphics primitive for the image of the dialog prompt, such as a bitmap or other graphics object generated by the operating system.

At block 1010, as a result of receiving the selection of the menu item 116, the service automatically activates the web browser module on the user computer device and directs the web browser to a URL of the dialog prompt information website 308. The browser transmits the URL to the website and further includes the hash value calculated for the image in the communication. For example, the hash value may be included in a query string included with the URL.

At block 1012, as a result of the web browser transmitting the URL with the hash value to the website 308, the website downloads the corresponding webpage 202 for the particular dialog prompt 106 that is the subject of the query on the dialog prompt. For example the webpage 202 is displayed on the user's display such as is illustrated in FIG. 2.

At block 1014, the user is able to read the information contained on the download webpage and determine a desired course of action in response to the dialog prompt 106.

Computing Device Implementations

The modules described above, including service module 410, aggregating module 510, and website module 512, can be employed in many different environments and situations for aggregating, providing and retrieving information on dialog prompts. Generally, any of the functions described with reference to the figures can be implemented using software, hardware (e.g., fixed logic circuitry), manual processing, one or more particular machines, or a combination of these implementations. The term "logic, "module" or "functionality" as used herein generally represents software, hardware, or a combination of software and hardware that can be configured to implement prescribed functions. For instance, in the case of a software implementation, the term "logic," "module," or "functionality" can represents program code (and/or declarative-type instructions) that performs specified tasks when executed on a processing device or devices (e.g., CPUs or processors). The program code can be stored in one or more computer-readable memory devices or media. Thus, the methods and modules described herein may be implemented by a computer program product. The computer program product may include computer-readable storage media having a computer-readable program code embodied therein. The computer-readable program code is adapted to be executed by one or more processors to implement the methods and/or modules of the implementations described herein. The terms "computer-readable storage media", "processor-accessible storage media", or the like, refer to any kind of machine storage medium for retaining information, such as a the various kinds of storage devices discussed above.

FIG. 11 illustrates a general depiction of a computing device and functionality implementation 1100 that can be used to implement the computing devices 302, 304 and the modules described herein. The computing device implementation 1100 includes one or more processors 1102, a memory 1102, communication interfaces 1106, a display 1108, other input/output (I/O) devices 1110, and one or more mass storage devices 1112 in communication via a system bus 1114. Memory 1104 and mass storage device 1112 are examples of the computer-readable storage media described above for storing instructions which perform the various functions described above when executed by the processing devices 1102. The processing functionality 1100 can also include one or more communication interfaces 1106 for exchanging data with other devices, such as via the network, direct connection, or the like, as discussed above. The display 1108 is a specific output device for displaying information, and is used to display any dialog prompts, and webpage providing information on the dialog prompts. The other input/output devices 1110 are devices that receive various inputs from the user and provide various outputs to the user, and can include a keyboard, a mouse, audio input/output devices, a printer, and so forth. The computing device functionality 1100 described herein is only one example of a computing environment and is not intended to suggest any limitation as to the scope of use or functionality of the computer and network architectures that can services for gathering and providing information on dialog prompts. Neither should the computing device implementation 1100 be interpreted as having any dependency or requirement relating to any one or combination of components illustrated in the computing device implementation 1100. In some implementations, computing device implementation 1100 can be, for example, aggregating computing device 302, user computing device 304, or a web server.

In addition, implementations herein are not necessarily limited to any particular programming language. It will be appreciated that a variety of programming languages may be used to implement the teachings described herein. Further, it should be noted that the system configurations illustrated in FIGS. 1-5 and 11 are purely exemplary of systems in which the implementations may be provided, and the implementations are not limited to the particular hardware configurations illustrated.

It may be seen that this detailed description provides various exemplary implementations, as described and as illustrated in the drawings. This disclosure is not limited to the implementations described and illustrated herein, but can extend to other implementations, as would be known or as would become known to those skilled in the art. Reference in the specification to "one implementation", "this implementation", "these implementations" "some implementations" or "implementations" means that a particular feature, structure, or characteristic described in connection with the implementations is included in at least one implementation, and the appearances of these phrases in various places in the specification are not necessarily all referring to the same implementation. Additionally, in the description, numerous specific details are set forth in order to provide a thorough disclosure. However, it will be apparent to one of ordinary skill in the art that these specific details may not all be needed in all implementations. In other circumstances, well-known structures, materials, circuits, processes and interfaces have not been described in detail, and/or illustrated in block diagram form, so as to not unnecessarily obscure the disclosure.

Conclusion

From the foregoing, it may be seen that implementations herein use hash values in proxy for images to enable aggregating and indexing of images from multiple computing devices for creating a knowledge base regarding certain images determined to be of interest, while still protecting user privacy. Some implementations described herein collect and provide information on dialog prompts, and are able to assist a user in determining a proper response to a dialog prompt. For example, implementations herein enable a user to automatically access a webpage that provides information regarding a dialog prompt. Further, some implementations automatically aggregate information on dialog prompts seen by a large number of users for creating a knowledge base regarding the dialog prompts, while still protecting privacy of individual users. Further, implementations herein utilize hash values of images in proxy for the images themselves, such as for obtaining information on the images from a website.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims. Additionally, those of ordinary skill in the art appreciate that any arrangement that is calculated to achieve the same purpose may be substituted for the specific implementations disclosed. This disclosure is intended to cover any and all adaptations or variations of the disclosed implementations, and it is to be understood that the terms used in the following claims should not be construed to limit this patent to the specific implementations disclosed in the specification. Instead, the scope of this patent is to be determined entirely by the following claims, along with the full range of equivalents to which such claims are entitled.

The invention claimed is:

1. One or more computer-readable storage devices storing processor-executable instructions that when executed by one or more processors implement a method comprising:
   receiving a dialog prompt on a display at a computing device;
   initiating a query for information regarding the dialog prompt;
   in response to the initiating of the query,
      automatically activating a web browser on the computing device without user input explicitly directed to activating the web browser, the activation including executing the web browser;
      directing the web browser to a website containing information on the dialog prompt; and
      providing the web browser with a hash value calculated for an image corresponding to the dialog prompt such that the web browser provides the hash value to the website, wherein the website uses the hash value provided by the web browser to locate a webpage containing information on the dialog prompt; and
   receiving the webpage at the computing device from the website as a result of providing the hash value to the web browser, wherein the webpage contains information regarding the dialog prompt;
   wherein the image corresponding to the dialog prompt for which the hash value is calculated is an image generated based on prerendering information used in rendering the dialog prompt for display on the display of the computing device and the prerendering information is not derived from a screen capture image.

2. The computer-readable storage devices according to claim 1, the method further comprising:
   detecting a predefined user action regarding the dialog prompt;
   providing selectable item displayed on the display as a result of detecting the predefined user action regarding the dialog prompt, wherein the selectable item is selectable for initiating the query; and
   detecting selection of the selectable item, wherein the query is initiated by the selection of the selectable item.

3. The computer-readable storage devices according to claim 1, the method further comprising:
   monitoring mouse click events on the computing device;
   capturing an image of an object that is the focus of the mouse click event for a detected mouse click event;
   calculating a current hash value corresponding to the object that is the focus of the mouse click event from the captured image of the object;
   comparing the current hash value with existing hash values previously calculated for previous mouse click events; and
   storing the captured image when the results of the comparing show that the current hash value matches one of the existing hash values.

4. The computer-readable storage devices according to claim 3, the method further comprising:
   sending the captured image and corresponding hash value to an aggregating computing device over a network.

5. The computer-readable storage devices according to claim 1, wherein the directing and providing are performed without user input.

6. A method implemented by a computing device including one or more processors executing instructions embodied in computer-readable storage media, the method comprising:
   monitoring mouse click events on the computing device;
   for a detected mouse click event, capturing an image of an object that is a focus of the mouse click event;
   calculating a current hash value corresponding to the object that is the focus of the mouse click event from the captured image of the object;
   comparing the current hash value with existing hash values previously calculated for previous mouse click events;
   storing the captured image in response to the comparing showing that the current hash value matches one of the existing hash values; and
   maintaining a hash table on the computing device containing the existing hash values previously calculated for images captured in response to previous mouse click events, wherein the hash table further includes pointers to stored images corresponding to hash values that have been calculated at least twice.

7. The method according to claim 6, further comprising:
   sending the captured image and corresponding hash value to an aggregating computing device over a network.

8. The method according to claim 7, further comprising:
   sending the captured image and corresponding hash value to the aggregating computing device as a result of initiating a query for obtaining information on the object.

9. The method according to claim 6, wherein the object that is the focus of the mouse click event is a dialog prompt and the captured image is an image of the dialog prompt obtained as an operating system object captured prior to rendering of the dialog prompt and stored in a buffer.

10. The method according to claim 6, further comprising:
receiving a new image on a display at a computing device; and
initiating a query for information regarding the new image, wherein the query is based on a new hash value calculated for the new image.

11. The method according to claim 10, wherein initiating the query further includes automatically activating a web browser to provide the new hash value calculated for the new image to a website.

12. The method according to claim 11, further comprising:
receiving a webpage containing information on the new image from the website in response to the query, wherein the new hash value provided in the query is used by the website to locate the webpage.

13. A system comprising:
at least one first computing device having one or more processors coupled to computer-readable storage media storing instructions for configuring the at least one first computing device,
wherein the at least one first computing device is configured to receive a plurality of images and corresponding hash values calculated for the images from a plurality of second computing devices,
wherein the at least one first computing device is further configured to identify hash values that match with each other and that were also received from a predefined minimum threshold number of distinct second computing devices of the plurality of second computing devices for providing information regarding an image corresponding to a matched hash value that meets the minimum threshold.

14. The system according to claim 13, wherein the at least one first computing device is further configured to generate a webpage corresponding to the matched hash value and the corresponding image.

15. The system according to claim 14,
wherein the at least one first computing device is further configured to receive a request from one of the second computing devices that is in communication with the at least one first computing device via a network, wherein the request includes a query hash value,
wherein the at least one first computing device is further configured to determine a webpage corresponding to the query hash value received from the second computing device and provide the webpage to the second computing device.

16. The system according to claim 13,
wherein the at least one first computing device is further configured to host a website containing webpages including information regarding a plurality of the images,
wherein the webpages are indexed according to hash values calculated for the images that are subjects of the respective webpages.

17. The system according to claim 13, wherein the at least one first computing device is a web server and the second computing devices are a plurality of user computing devices in communication with the web server via the Internet.

18. The system according to claim 13, wherein the at least one first computing device is configured to maintain a list of hash values for which webpages have been created, compare a newly received hash value with the list of hash values, and determine whether a webpage has been created that corresponds to the newly received hash value by comparing the newly received hash value to the list of hash values.

19. The system according to claim 13, wherein the hash values are each a hash value calculated for the corresponding image based on a version of the corresponding image, the version of the corresponding image obtained based on information used in rendering the image for display on a display of the second computing device, the version of the corresponding image is a non-screen capture image.

* * * * *